United States Patent [19]
Hawkins et al.

[11] Patent Number: 5,497,317
[45] Date of Patent: Mar. 5, 1996

[54] DEVICE AND METHOD FOR IMPROVING THE SPEED AND RELIABILITY OF SECURITY TRADE SETTLEMENTS

[75] Inventors: John G. Hawkins, Hopkinton; Loni J. Paul, Charlestown; Phillip R. Cardwell, Marblehead; Peter T. Reeves, Needham; Helen B. Dean, Milford; Daniel B. Doherty, V, Scituate; Paul J. Flaherty, Brighton, all of Mass.

[73] Assignee: Thomson Trading Services, Inc., Boston, Mass.

[21] Appl. No.: 174,231

[22] Filed: Dec. 28, 1993

[51] Int. Cl.⁶ .................................................. G06F 17/60
[52] U.S. Cl. ............................................................ 364/408
[58] Field of Search .................................. 364/408, 401; 235/379

[56] References Cited

U.S. PATENT DOCUMENTS

| | | |
|---|---|---|
| 4,346,442 | 8/1982 | Musmanno . |
| 4,376,978 | 3/1983 | Musmanno . |
| 4,571,463 | 2/1986 | Shefler . |
| 4,674,044 | 6/1987 | Kalmus et al. . |
| 4,694,397 | 9/1987 | Grant et al. .............................. 364/408 |
| 4,774,663 | 9/1988 | Musmanno et al. . |
| 4,823,265 | 4/1989 | Nelson . |
| 4,949,248 | 8/1990 | Caro . |
| 4,980,826 | 12/1990 | Wagner .................................. 364/408 |
| 5,101,353 | 3/1992 | Lupien et al. . |
| 5,136,501 | 8/1992 | Silverman et al. ...................... 364/408 |
| 5,220,501 | 6/1993 | Lawlor et al. . |
| 5,262,942 | 11/1993 | Earle ....................................... 364/408 |
| 5,285,383 | 2/1994 | Lindsey et al. ......................... 364/408 |

FOREIGN PATENT DOCUMENTS

| | | |
|---|---|---|
| 2161003 | 1/1986 | United Kingdom . |
| 2210714 | 6/1989 | United Kingdom . |

OTHER PUBLICATIONS

"Industry User Group—ETC" Business Requirements Specification, Version 1, 3 Feb. 1992.
"Institutional Delivery System—Interactive Machine Readable—Trade Output Specification", Version 01, Dep. Trust Co., Sep. 29, 1993.
"Institutional Delivery System—Interactive Machine–Readable" Trade Input Specification—Version 01, Dep. Trust Co., Sep. 29, 1993.
"Institutional Delivery System—Interactive ID" Input–Output Appendices, Depository Trust Co., Sep. 29, 1993.

*Primary Examiner*—Robert A. Weinhardt
*Attorney, Agent, or Firm*—St. Onge Steward Johnston & Reens

[57] ABSTRACT

A security trade settlement device is provided. The device comprises a database having a plurality of delivery instruction sets, a database receiver for receiving an identifier, a database searcher for searching the database, and a database transmitter for transmitting the retrieved instruction set corresponding to the identifier. The device preferably also comprises a participant transmitter for transmitting the identifier and a participant receiver for receiving and outputting the retrieved, transmitted delivery instruction set. The database preferably also includes a plurality of account information sets which include a custodian delivery instruction set specified by the institution. In other aspects, the invention comprises methods of operating the database and the security trade settlement communication device.

32 Claims, 5 Drawing Sheets

DEVICE AND METHOD FOR IMPROVING THE SPEED AND RELIABILITY OF SECURITY TRADE SETTLEMENTS

FIELD OF THE INVENTION

The invention relates to a system for settling securities trades, and more particularly, to a device and method for communicating settlement information among security trading participants.

BACKGROUND OF THE INVENTION

A variety of systems have been developed for automating portions of the securities trading business from customer accounts through order execution and block allocation.

U.S. Pat. Nos. 4,346,442 4,376,978 and 4,774,663, owned by Merrill Lynch, are directed to systems for operating and maintaining securities brokerage-cash management accounts.

Systems for monitoring market performance and aiding investors in the trade decision-making process have also been developed. British patent publications GB 2 161 003 A and 2 210 714 A are directed to systems for distributing, processing and displaying financial information. U.S. Pat. No. 4,949,248 discloses a local area network for shared access of information services or shared control of application programs, having particular utility for trading rooms of securities firms.

U.S. Pat. Nos. 4,674,044, 4,823,265 and 5,101,353 are directed to electronic trade execution systems.

The prior art system of FIG. 5 transmits messages to brokers alerting them to changes in institutional investors' accounts. Following trade execution, the prior art system of FIG. 6 permits institutional investors to transmit information to the broker concerning allocation of the shares of an executed block trade among various ones of an institution's accounts. When used in conjunction with the system of FIG. 5, the FIG. 6 system transmits account information to brokers for each block trade allocation.

The Depository Trust Company's (DTC) Institutional Delivery (ID) System is designed to partially automate the book entry settlement of DTC-listed U.S. equities. At the end of each U.S. trading day, brokers report trade information on a batch basis to DTC. The day after the trade, so-called "T+1", DTC issues a confirmation message to the pertinent broker, institution and custodian bank, and the institution returns an affirmation prior to book entry settlement. This system is only useable for DTC-listed U.S. equities, requires brokers to collect and input information relative to each trade, provides no mechanism for insuring the accuracy of the trade information, and does not operate on a real time basis.

At least the last of these limitations will allegedly be addressed by DTC's forthcoming interactive ID system. Specifications disclosing the type of information this new system would be capable of handling as compared with batch ID were printed on Sep. 29, 1993.

None of the prior art systems are directed to improving the accuracy of, and speed of communication of, instructions for exchanging the purchase money and the security to settle an executed trade. Thus, none of the prior systems adequately speeds trade settlement which is accomplished, if at all, by a patchwork of faxes, telexes and telephone calls among institutional investors, brokers, and custodians.

The speed with which trade decisions can now be made and executed has put increasing pressure on security trading participants, including institutional investors, brokers, and custodians to speed up the trade settlement process during which the purchase money is transferred to the broker or seller's agent, and title to the securities is transferred to the buyer's agent or broker.

The Securities and Exchange Commission has recently mandated that as of Jun. 1, 1995, U.S. securities must be settled within three days of the trade date, so-called "T+3". Currently, U.S. securities must be settled within five days of the trade date or "T+5". Thus, settlement systems which do not operate on a real time basis may suffer increasing numbers of settlement failures due to elapsed time.

Settling global securities trades ks particularly difficult due to regulatory overlap, regulatory voids, language barriers, fluctuating exchange rates, multiple taxing authorities, the physical distance between the parties, and other factors. On cross border trades, settlement failures may be as high as 30%. With institutional investors routinely making cross border trades for blocks of over 100,000 shares, settlement failures are very expensive for all parties. Settlement delays are also costly since the uncertainty of outcome limits investors' abilities to place subsequent trade orders.

Recognizing the need to reduce settlement time for cross border securities trades, two organizations have worked on parallel paths to standardize the type and format of data transmitted between security trading participants. In Europe, the Industry User Group (IUG) published a "Business Requirements Specification", ver. 1, on Feb. 3, 1992, setting standard formats of electronic messages between institutional investors and brokers. In the United States, the Industry Standardization for Institutional Trade Communication (ISITC) committee has published its own standard format for moving trade details between institutional investors and custodians. These formats standardize the type of information exchanged between security trading participants but do not disclose or suggest specific systems or methods for achieving the exchange, speeding the exchange, or improving accuracy of the information exchanged.

What is desired, therefore, is a system for improving the accuracy of trade settlement information and the speed with which trade settlement information is communicated to trade settlement participants to reduce the time required to settle securities trades and to improve the settlement rate for securities trades. Providing a system in which the settlement information complies with both the IUG and ISITC standard formats is also desired.

SUMMARY OF THE INVENTION

Accordingly, it is an object of the invention to provide a communication device and method for use by security trading participants which improves the speed and accuracy of trade settlement.

Another object of the invention is to provide a communication device and method of the above character which is compatible with one or both of the IUG and ISITC standards.

A further object of the invention is to provide a communication device and method of the above character including a database which is automatically accessed by the communication device.

Yet another object of the invention is to provide a communication device and method of the above character for automatically transmitting custodians' delivery instructions to brokers.

Still a further object of the invention is to provide a communication device and method of the above character for automatically transmitting brokers' delivery instructions to custodians and/or to institutions.

Still another object of the invention is to provide a communication device and method of the above character for automatically transmitting institutional investors' account information to brokers.

These and other objects of the invention are achieved by provision of a security trade settlement communication device comprising a database for storing a plurality of delivery instruction sets, a database receiver for receiving an identifier, a database searcher for searching the database, and a database transmitter for transmitting the retrieved instruction set corresponding to the identifier. The database preferably also includes a message generator for informing participants of changes to the database.

The communication device also includes a participant transmitter for transmitting the identifier and a participant receiver for receiving and outputting the retrieved, transmitted delivery instruction set. Most preferably, the communication device transmitters and receivers are both receiver-transmitters for performing each other's functions and comprise input units for adding or changing delivery instruction sets on the database. The receiver-transceivers may also be used for non-settlement communications among the participants, e.g., by electronic mail, through a message router at the database.

The database preferably also includes a plurality of account information sets which include a custodian delivery instruction set specified by the institution. In this regard, the institutions' receiver-transmitters also comprise input units for adding or changing account information sets on the database.

The database preferably also includes cross-reference tables between custodians and account identifiers and between account identifiers and broker internal account numbers for correlating alert and trade settlement messages among the participants.

In other aspects, the invention comprises methods of operating the database and the security trade settlement communication device.

The invention and its particular features and advantages will become more apparent from the following detailed description considered with reference to the accompanying drawings.

DETAILED DESCRIPTION OF THE INVENTION

Figure 1:
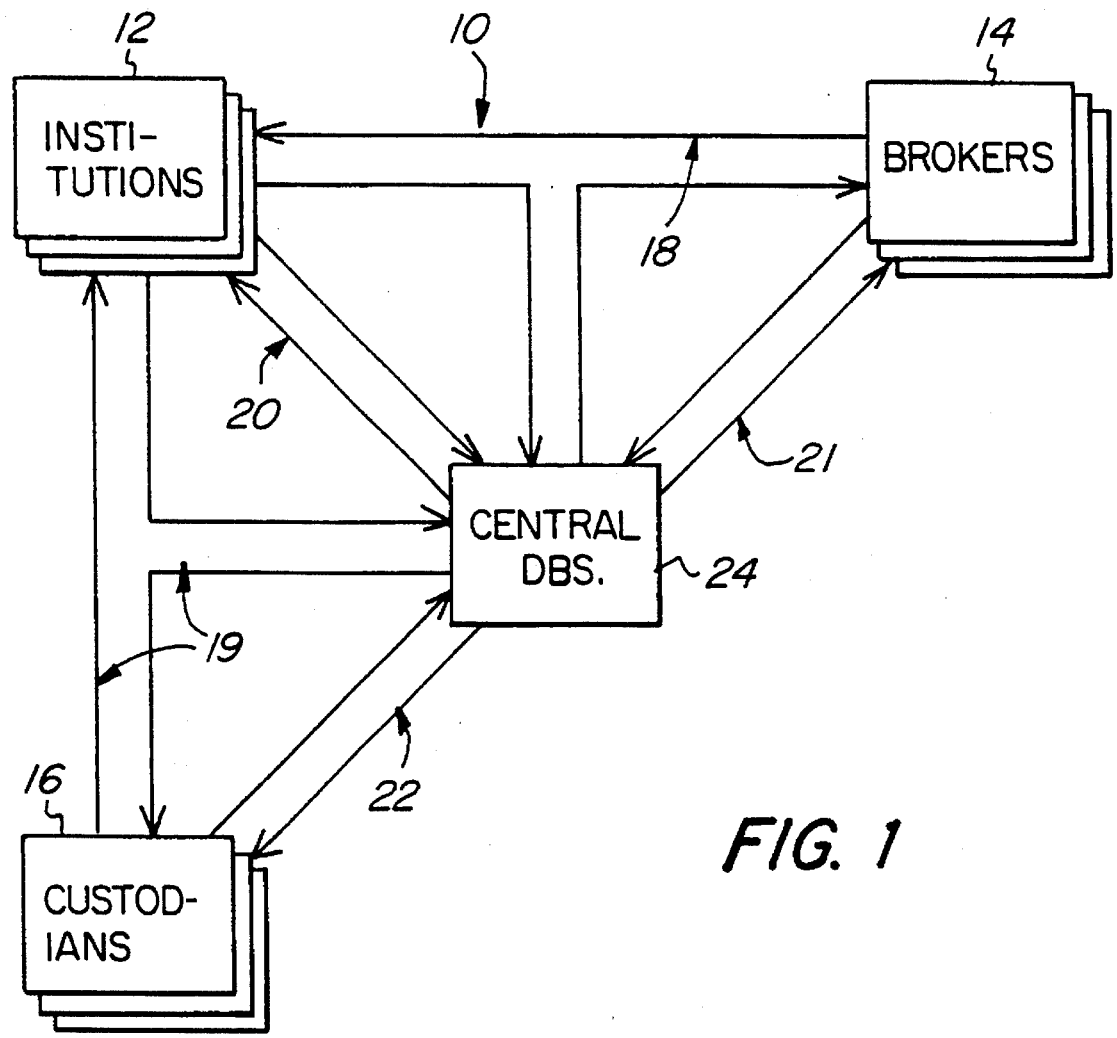
FIG. 1 is a block diagram of a communication device and method in accordance with the invention.

FIG. 1 is a block diagram of a device and method 10, in accordance with the invention, for communicating security trade settlement information between security trading participants such as myriad institutional investors 12, myriad brokers 14, and myriad custodians 16. By "institutional investors" is meant retirement and pension funds, mutual fund companies, investment advisors, insurance companies and other investors which manage and trade for two or more accounts. By "custodians" is meant banks, security depositories, and other settlement agents.

Each line on FIG. 1 schematically depicts a communication link in method and device 10. The diagonal lines 20, 21, 22 represent communication links between security trading participants and a central database 24, and between the participants themselves for exchanging messages, e.g. electronic mail, not relating to settlement of a particular trade. These diagonal links 20, 21, 22 are discussed in more detail with reference to FIG. 2. The horizontal and vertical lines 18 between institutions and brokers represent communication links utilized immediately after trade execution to settle the trade. Similarly, the horizontal and vertical lines 19 between institutions and custodians represent security trade settlement communication links. Links 18, 19 are discussed in more detail with reference to FIGS. 3 and 4.

Communication links 18–22 are telephone lines, however, it is understood that dedicated wire or wireless links may also be used. It is understood that by "wire" is meant any physical connection, whether by optical fiber, coaxial cable, twisted pair or otherwise, and that by "wireless" is meant cellular, microwave, IR, laser or any other non-physical connection. In this regard, the security trading participants 12, 14, 16 each have computers, terminals, input/output devices, transceivers or the like (not shown) for transmitting and receiving messages and information, e.g. by modem, over the communication links.

Reference in this description to the trading participants, thus, includes the participants' system terminals. Each of these terminals includes a unique name or acronym identifying it as the transmitter or recipient of messages over the system, and each terminal includes application software written in C for maintaining and operating central database 24 as described with reference to FIG. 2 and for establishing communication links 18–22 as described with reference to FIGS. 1, 3 and 4. The terminals themselves are typically PCs having minimum recommended system requirements of DOS 3.3 or higher, an Intel 386 microprocessor operating at 33 MHz, 2 Mb of random access memory, 450 kb of free memory, and a 2400 baud transceiver, e.g. modem. Although it is understood that dummy terminals wired to host computer may also be used. These PCs may but need not be linked to the participants' back office computer system. Further, a particular participant may have numerous system terminals linked together by a LAN or otherwise so that steps of method 10 may be carried out by different persons at the particular participant.

Figure 2:
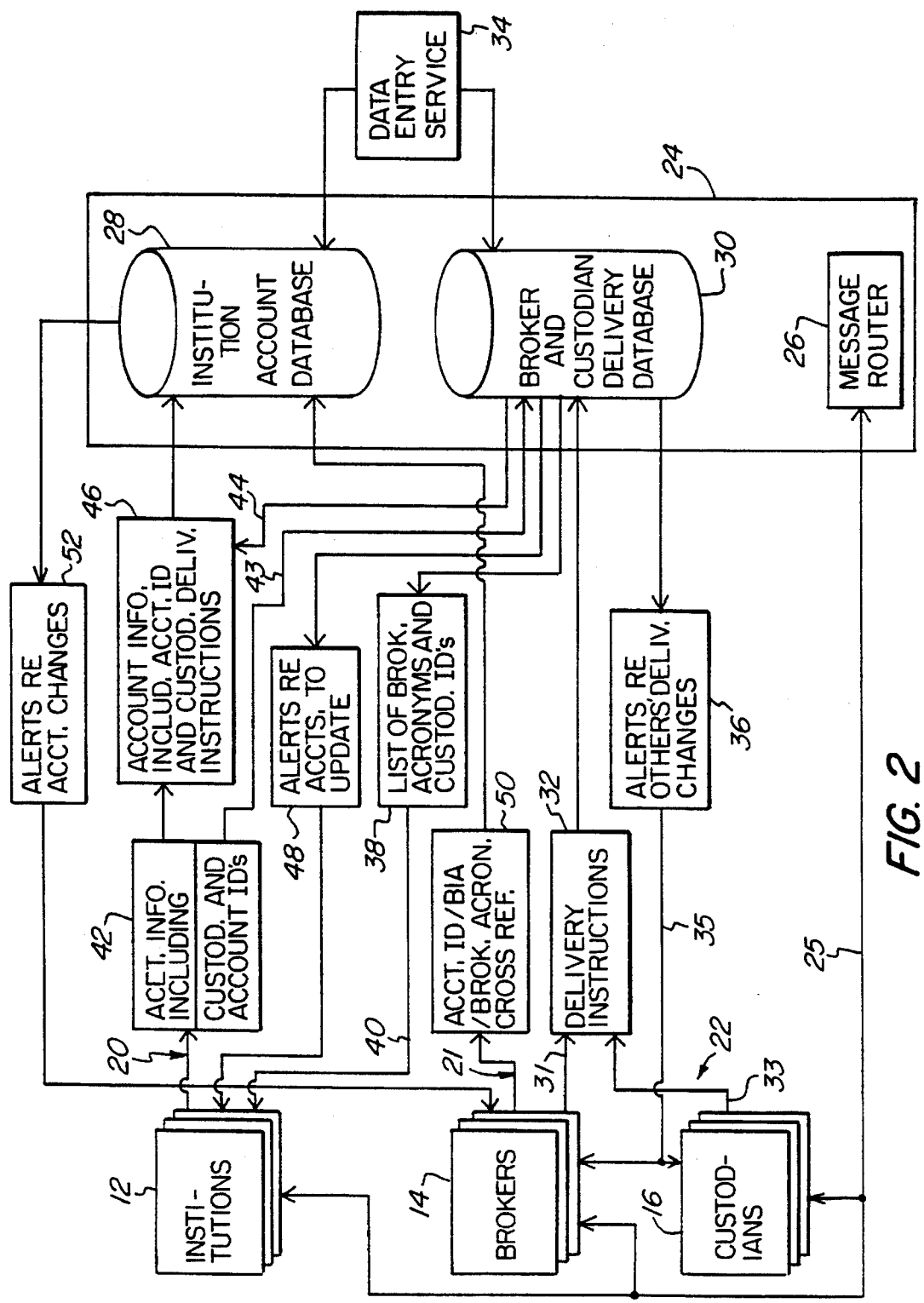
FIG. 2 is a block diagram of the database of the communication device and method of FIG. 1.

Referring to FIGS. 1 and 2, the construction, maintenance and operation of central database 24 is described. Central database 24 is a host computer having minimum recommended system requirements of a SUN MICROSYSTEMS MP 670 computer having 4 RISC processors, 64 Mb of random access memory, 5 Gb of online storage, a UNIX operating system and SYBASE database software which may be called in C by the participants' terminals' application software. In this particular hardware configuration, central database 24 has a system capacity of 40,000 transactions per day, 150,000 total account records, and 2.5 million BIAs. The host operates a message router 26 for handling electronic mail between participants 12, 14, 16 over line 25; an institution account database 28; and a broker and custodian delivery database 30.

Brokers 14 and custodians 16 input delivery instructions 32 to delivery database 30 along respective lines 31, 33. Delivery instructions 32 are stored on database 30 in a format compatible with, or retrievable under, both the IUG and ISITC standards. The instructions include information such as the country of origin of the security, the security type, and clearing method details. In this regard, the type of information stored on delivery database 30 is much more detailed and thorough than that anticipated by, e.g., the IUG standard which includes a single field for settlement information. In the event brokers and custodians do not wish to directly input delivery instructions 32 using their local terminals, they may contract with a data entry service 34 to do it for them.

Each set of delivery instructions 32 on database 30 is stored and retrievable under a unique identifier. The identifiers comprise an identification of the particular instruction set for the named broker or custodian. For example, individual brokers are likely to have numerous delivery instruction sets depending upon the type and nationality of the traded security. Similarly, individual custodians are likely to have numerous delivery instruction sets depending not only upon the type and nationality of the traded security, but also upon which of its institutional investor clients ordered the trade. The identifier may also include the broker or custodian acronym.

As delivery instruction sets 32 are added to or modified on delivery database 30, alert messages 36 are generated by central database 24 for communication along line 35 to the other brokers 14 and custodians 16, informing them of the delivery instruction changes. In this regard, and as with participants 12, 14, 16, it is understood that central database 24 includes a wire or wireless transceiver for receiving information for storage and retrieval requests, and for transmitting alerts and retrieved information. The software in the brokers' and custodians' terminals may be customized to eliminate all but requested ones of these alert messages 36, or all but alert messages from particular brokers 14 and/or particular custodians 16. This selection of alert messages 36 is readily accomplished where the delivery instruction identifiers include acronyms naming the originating broker or custodian, where these acronyms may be sifted and sorted to eliminate undesired alert messages 36.

A list 38 of custodian identifiers and broker acronyms under which delivery instruction sets 32 have been stored on database 30 is provided on line 40 to institutions 12. Institutions 12 use the broker acronyms for receiving and transmitting trade settlement communications with brokers 14 as described below with reference to FIG. 3. Institutions 12 use the custodian identifiers in generating account information 42 for storage on institution account database 28. Account information 42 is stored on, and may be retrieved from, database 28 using unique account identifiers for each set of account information. The account identifiers, as with the broker and custodian identifiers, comprise an identification of a particular account at the named institution, and may also include an institution's name or acronym.

Account information 42 includes a custodian identifier for retrieval along lines 43, 44 from delivery database 30 of the delivery instructions 32 corresponding to the specified custodian identifier. As indicated at 46, account information 42 and the retrieved, specified custodian delivery instructions are combined for storage on account database 28.

In addition to retrieving delivery instructions, line 43 also carries a cross reference table of account identifiers and custodian identifiers for storage on delivery database 30. This cross reference or look-up table is used by central database 24 to generate alert messages 48 informing institutions 12 of changes in custodian delivery instruction sets specified by each particular institution for each particular account.

In response to alert messages 48, institutions 12 may update their corresponding account information by retrieving the changed custodian delivery instructions along lines 43, 44 and re-saving them on account database 28. In this regard, the database software of institutions' terminals may be customized to automatically initiate these updates, save the alerts for review and possible communication with the appropriate custodians, or perform some other function.

Brokers 14 generate cross reference tables 50 between broker acronyms, broker internal account numbers (BIAs), and account identifiers for each particular client institution account. BIA/account identifier table 50 is stored on account database 28 for use by central database 24 to generate alert messages 52 for transmission to brokers 14 identified in the broker acronym informing them of changes in account information for BIAs cross-referenced to the account information in table 50. The changes may be to either the custodian delivery instruction portion or the account portion of account information 46.

As with delivery database 30, institutions 12 and brokers 14 may directly maintain account database 28 through terminals at their locations, or they may contract with data entry service 34 to change and enter account information 46 and BIAs on the database.

Information retrieved from central database 24 for use in settling security trades is very accurate since each participant 12, 14, 16 enters information on databases 28, 30 pertaining to it and since alert messages 36, 48, 52 permit affected participants to review changes made to the databases in real time. Anomalies spotted in database information can be resolved by immediate communications between affected participants via message router 26 before significant settlement delays or failures ensue.

Storing custodian delivery instructions on both the delivery database 30 and the account database 28 serves several functions. First, it prevents custodians from making changes to the settlement of securities traded for an institutions' account without the institutions' consent. Second, it permits more rapid retrieval and transmission of security settlement information from the institutions to the brokers since only a single database needs to be accessed.

Figure 3:
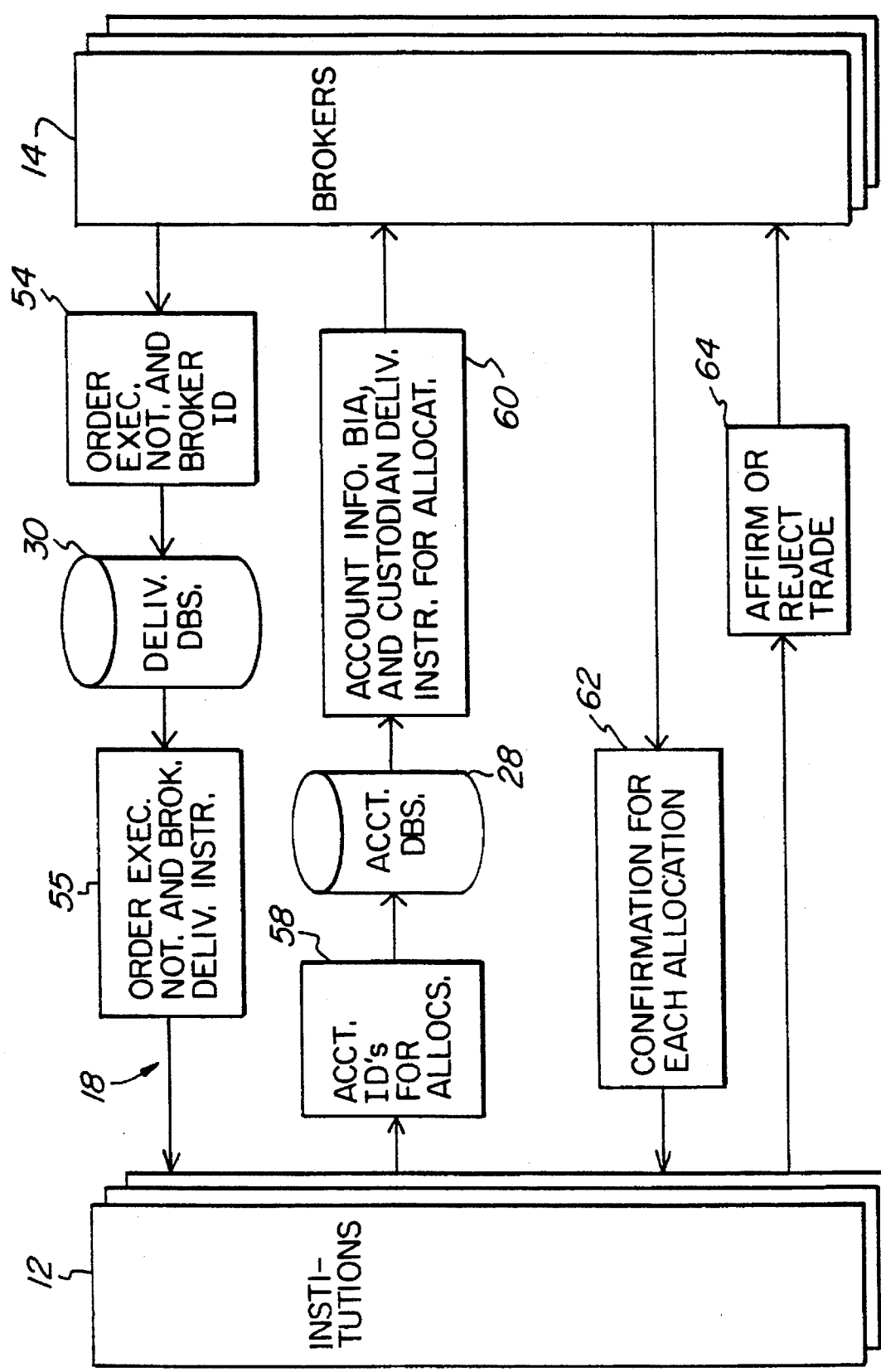
FIG. 3 is a block diagram of a portion of the communication device and method of FIG. 1 for transmitting settlement information between brokers and institutional investors.

As illustrated in FIG. 1, central database 24 is used for trade settlement communication links 18 between institutions 12 and brokers 14. Referring to FIG. 3, the device and method 10 of security trade settlement is described beginning with communication links 18.

Institutions 12 typically manage many different accounts, for example different mutual funds within a fund family, and pool trade orders from these various accounts for block execution. Continuing the example, if funds A, B, and C managed by a single institution 12 all wish to buy 10,000 shares of XYZ Corp. stock, then the institution 12 will place a single buy order with a particular broker 14 for a block of 30,000 shares of XYZ Corp. stock. The buy order may or may not be executed as a single trade at a single price, but after all 30,000 shares have been purchased broker 12 transmits an order execution notice 54 including the broker identifier to institution 12 using the institution's acronym which may be obtained from the trade order. Order execution notice 54 also includes the security name, security type, country of origin of the security, the number of shares traded at each different price, the total number of shares traded, and the average price per share.

Before receipt by institution 12, however, the broker identifier portion of order execution notice 54 is used by central database 24 to retrieve, from delivery database 30, the broker delivery instruction set corresponding to the broker identifier. Central database 24 then transmits the retrieved broker delivery instructions together with the order execution notice, as indicated at box 55, to the named institution.

Device and method 10 is for settling trades, not placing orders, and thus no communication links are provided prior to trade execution. However, Thomson Financial Services' Trade Order Routing System (TORS) is a software product for use on institutions' and brokers' terminals permitting institutions to place trade orders with brokers using device and method 10. In addition, Thomson Financial Services' Trade Order Tracking System (TOTS) permits institutions 12 to follow execution of pieces of its block order, via participating brokers, in real time, prior to receipt of order execution notice 54.

Upon receipt of execution notice 54, institutions 12 transmit block allocation information 58 comprising the number of shares and account identifier for each of the institutions' accounts or funds participating in the trade, e.g. 10,000 shares to Fund A, 10,000 shares to Fund B, and 10,000 shares to Fund C, to account database 28. Received account identifiers are used to retrieve account information, the BIA, and custodian delivery instructions for each account as indicated at 60. The account information may include the account name, tax identification number, country of origin, the account registration name, tax withholding information, type of account, confirmation and statement addresses, telex instructions, security and cash account numbers, and contact and phone numbers. This retrieved data is for transmission by central database 24 to broker 14 by acronym. The account information, BIA and custodian delivery instructions are appended to order execution notice 54 initiated by broker 14, however, it is understood that this data could also be transmitted as a separate message.

Using the BIA, brokers 14 match the allocation account and custodian delivery information 60 to their log of executed trades to insure they are the proper recipients of the allocation information, and that they have received settlement instructions for each traded share. If there is no match, brokers 14 report this fact to institutions 12, otherwise brokers 14 transmit confirmation messages 62 to the institutions' acronym for each allocation. Confirmation message 62 includes detailed financial information about the trade including applicable commissions, taxes, exchange rates, and total funds required to settle the trade. Institutions 12 receive and review confirmation messages 62, especially the financial portions concerning total funds to settle the trade, and transmit a message 64 back to the broker's acronym either affirming or rejecting the trade. The confirmation and affirmation or rejection are appended to allocation account and custodian delivery information 60, but may also be transmitted as a separate message, if desired.

It is understood that review of the various messages on the part of institutions and brokers is described merely as the preferred use of device and method 10, but is in no way binding on the institutions and brokers. Device and method 10 provides a system for communicating trade settlement information between security trading participants, but not a system for trading or settling securities. The enforceability of contracts or obligations undertaken in communications over system 10 is solely a matter between the participants themselves and does not in any way involve the provider of communication system 10.

Figure 5:
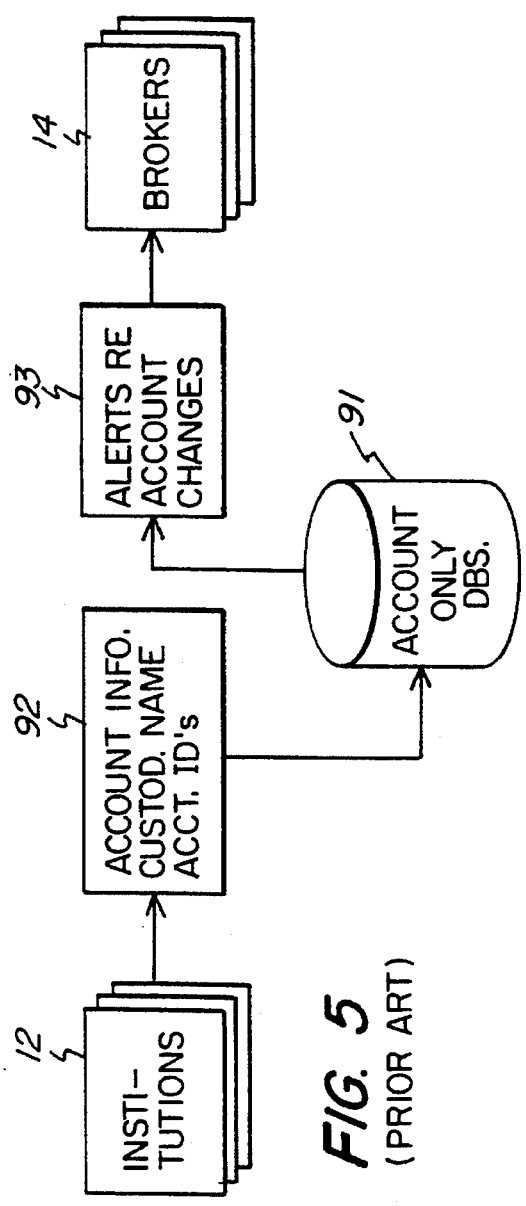
FIG. 5 is a block diagram of a prior art system for transmitting messages to brokers alerting them to changes in institutional investors' accounts.

Referring to FIG. 5, Thomson Financial Services' prior art ALERT product provided one portion of the functions of central database 24. ALERT included a database 91 of account information 92 including an account identifier and the name of the institutions' custodian for each account, but not including delivery instructions for the custodian. Messages 93 alerting brokers 14 to changes in account information 92 were generated by database 91 for transmission to the brokers. However, alert messages 93 important to a particular broker were often lost in a sea of messages irrelevant to the broker yet clogging his terminal, since no means for filtering out unwanted messages was provided.

Figure 6:
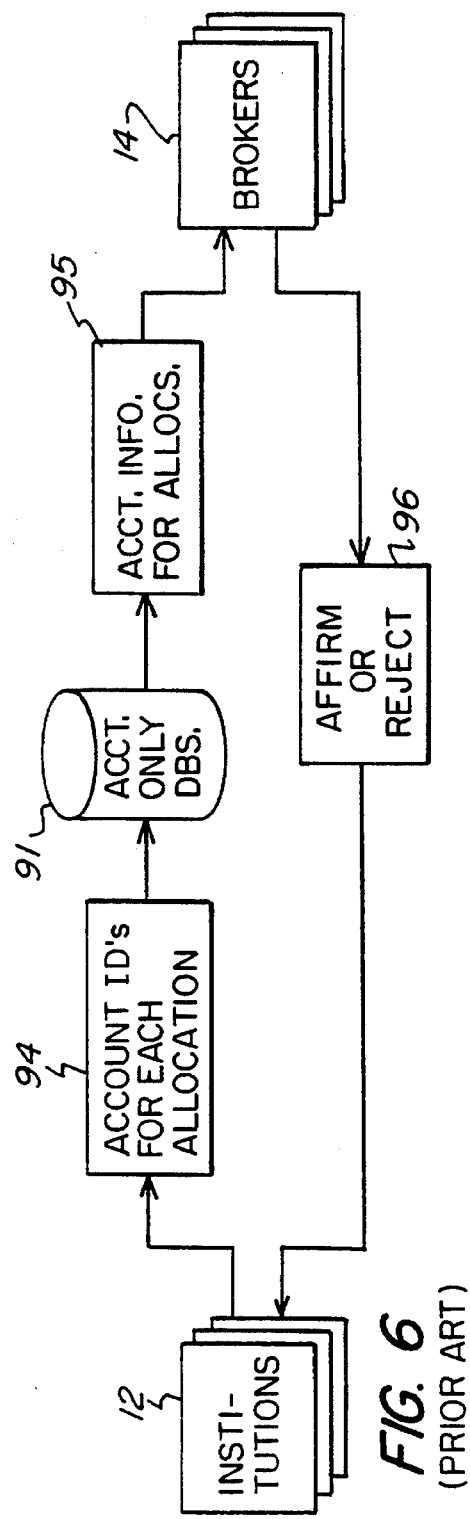
FIG. 6 is a block diagram of a prior art system for transmitting block trade allocations to brokers, or for use with the system of FIG. 5 for transmitting account information for each block trade allocation to brokers.

Referring to FIG. 6, Thomson Financial Services' prior art OASYS product in conjunction with its ALERT product provided a portion of the functions of communication link 18. Following order execution, institutions 12 used OASYS to transmit account identifiers for each allocation 94 to account only database 91 for retrieval of the account information for each allocation 95. After review, brokers 14 would transmit a message 96 to the institution affirming or rejecting the allocation information. Message 96 did not include any information regarding financial details of the trade or the brokers' delivery instructions.

Thomson Financial Services' ALERT and OASYS combination did not replace the patchwork of telephone calls, faxes and telexes typically used to settle a security trade, but only provided an additional medium for exchanging only a portion of the data necessary to settle a security trade, especially an international security trade which includes additional financial and regulatory issues for which communication may be hampered due to language barriers. All these factors can lead to costly security trade settlement delays and failures. Communication link 18 of device and method 10 provides a fast, efficient, integrated means of exchanging all necessary settlement information between institutions 12 and brokers 14.

Figure 4:
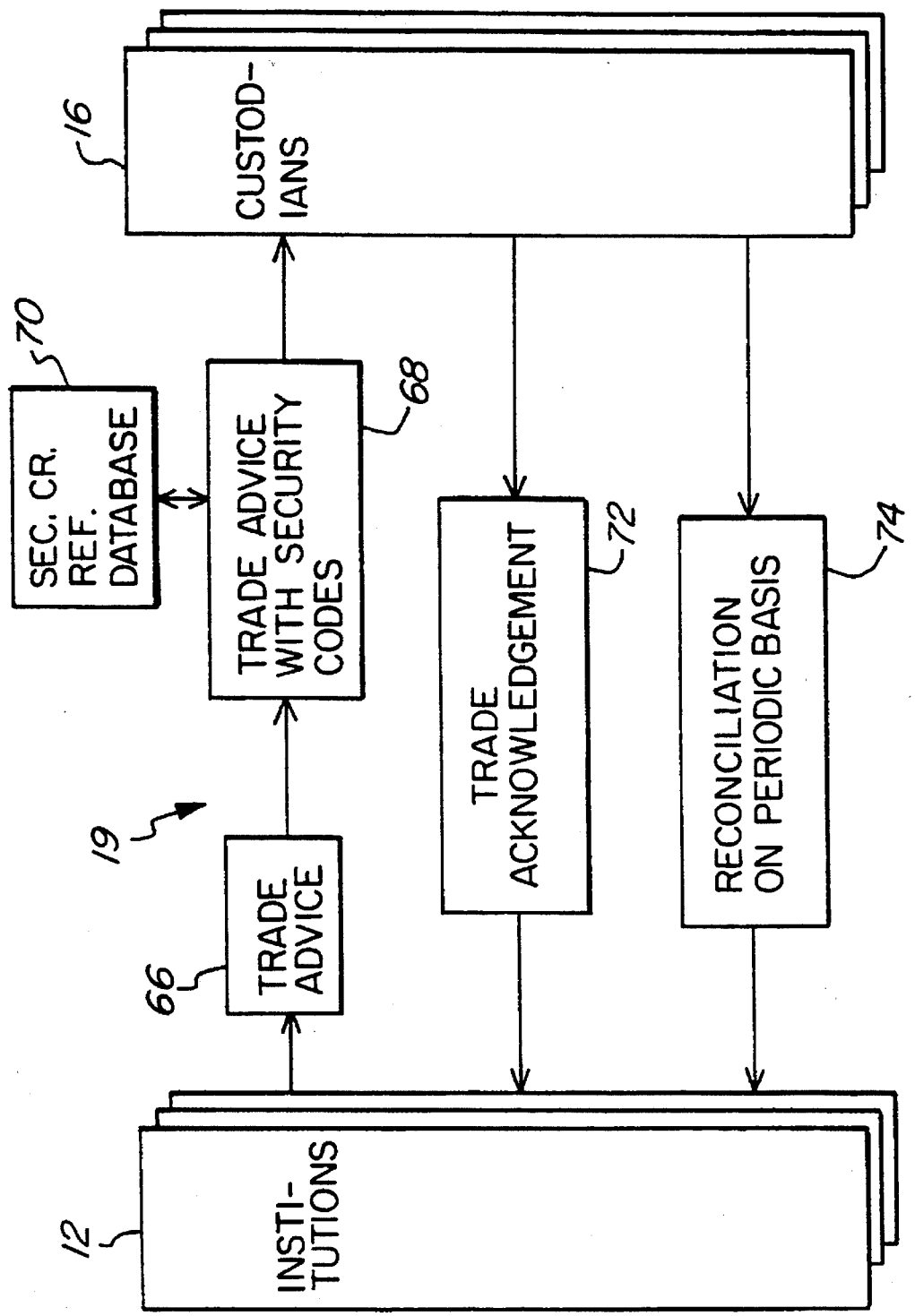
FIG. 4 is a block diagram of a portion of the communication device and method of FIG. 1 for transmitting settlement information between institutional investors and custodians.

The type and format of account information exchanged over communication link 18 complies with the IUG standard which aids in making device and method 10 compatible with back office computer systems at institutions or brokers. The exchanged delivery instruction information, however, is much more detailed than the single field allotted by the IUG standard. This additional detail reduces settlement delays and failures. Referring again briefly to FIG. 1, after exchange of settlement information with brokers 14, institutions 12 use communication link 19 to inform custodians 16 of the trade and provide them with the trading brokers' delivery instructions for settlement, as illustrated in FIG. 4.

After affirming the brokers' confirmations 62 for each allocation at 64, institutions 12 convert or reorganize the confirmations, which are in IUG format as necessary to put them in ISITC format and transmit the information as trade advice 66 to custodians 16. It is understood that at each step in the trade settlement process, additional information is appended to the exchanged message, such that information initially contained in the order execution notice now also includes account information, BIAs, custodian and broker delivery instructions, and financial details. In this regard, system 10 does not store or retain information pertaining to any particular executed trade, but only communicates this information among the participants. If desired, individual messages could be utilized or a record could be set up on the central database for each particular trade with access limited to the particular participants. By appending additional information to the original order execution notice, however, participants need not waste time matching messages, since a complete record of settlement communications is transmitted at each step in the process 10.

The security name portion of trade advice 66 is used to access various security coding system cross-references 70 such as CUSIP, ISIN, SEDOL, and the like. Cross-referenced databases 70 may be accessed at third party locations or, if desired, may be incorporated with central database 24. As indicated at box 68, trade advice 66 together with various security codes is transmitted to custodians 16. Upon receipt, custodians 16 transmit an acknowledgement 72 back to institutions 12 indicating that the custodians will undertake to settle the trade according to the received trade advice. Again, it is understood that the enforceability of any contractual obligation or undertaking between security trading participants 12, 14, 16 is solely a matter between the participants and not the provider of communication device and method 10 which merely enables information to be exchanged between the participants.

As a means of informing institutions 12 that trades have settled, custodians 16 provide periodic reconciliation reports 74 which include, e.g., the number of shares of each different security bought, sold and owned by each of the institutions' accounts during the period, the current share price and the share price at each of the transactions.

As described, communication link 18 accesses both the account and delivery databases 28, 30 while communication link 19 accesses neither. It is understood, however, that it may be desired, e.g. where institutions 12 do not need or want to review brokers' delivery instructions, for delivery database 30 to be accessed by communication link 19.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A device for communicating security settlement information between an investor, a broker and a custodian, comprising:

first and second databases having software and hardware for storing and retrieving data according to unique identifiers;

a plurality of broker delivery instructions stored on said first database according to broker identifiers;

information about a plurality of investor accounts stored on said second database according to account identifiers;

a broker transmitter for transmitting a broker identifier to a first database receiver;

a first database transmitter for transmitting a broker delivery instruction retrieved from said first database with the received broker identifier to an investor receiver;

an investor transmitter for transmitting the broker delivery instruction received from the first database transmitter, said investor transmitter also for transmitting an account identifier to a second database receiver;

a second database transmitter for transmitting account information retrieved from said second database with the received account identifier;

a broker receiver for allocating traded security shares according to the account information received from said second database transmitter; and a custodian receiver for initiating an exchange of funds and securities according to the broker delivery instruction received from said first database transmitter to settle the trade.

2. The device of claim 1 wherein the information about a plurality of investor accounts includes a custodian delivery instruction corresponding to the account for use by the broker to initiate an exchange of funds and securities to settle the trade.

3. The device of claim 1 including a plurality of custodian delivery instructions stored on said first database according to a unique custodian identifier, and wherein said first database includes means for generating a list of custodian identifiers from the stored custodian delivery instructions for use by the investor to specify a custodian for the investor account.

4. The device of claim 3 wherein said first database transmitter also transmits the list of custodian identifiers to the investor receiver.

5. The device of claim 4 wherein said investor transmitter also transmits a custodian identifier corresponding to an investor account to the first database receiver, and wherein said first database transmitter also transmits a custodian delivery instruction retrieved from said first database with the received custodian identifier to the second database receiver for storage on said second database.

6. The device of claim 3 including a custodian input device at a custodian location for generating a custodian delivery instruction to be stored on said first database.

7. The device of claim 6 including means for detecting storage of a custodian delivery instruction on the first database and for generating a message alerting the investor to storage of the custodian delivery instruction, and wherein said first database transmitter also transmits the message to the investor receiver.

8. The device of claim 1 including an investor input unit at an investor location for generating account information to be stored on said second database.

9. The device of claim 8 including means for detecting storage of information about an investor account on the second database and for generating a message alerting the broker to storage of the investor account information, and wherein said second database transmitter also transmits the message to the broker receiver.

10. The device of claim 1 including a broker input unit at a broker location for generating a broker delivery instruction to be stored on said first database.

11. The device of claim 10 including means for detecting storage of a broker delivery instruction on the first database and for generating a message alerting the custodian to storage of the broker delivery instruction, and wherein said first database transmitter also transmits the message to the custodian receiver.

12. A device for facilitating settlement of an investor's security trades, comprising:

first and second databases having hardware and software for storing and retrieving data according to unique identifiers;

a plurality of custodian delivery instructions stored on said first database according to custodian identifiers;

an investor transmitter for transmitting information about an investor account to a second database receiver, and for transmitting a custodian identifier corresponding to the account information to a first database receiver;

a first database transmitter including means for retrieving and transmitting the custodian delivery instruction corresponding to the received custodian identifier to the second database receiver;

the second database receiver for receiving the investor account information from the investor transmitter and for receiving the custodian delivery instruction from the first database transmitter, the second database including means for combining the account information and the custodian delivery instruction for storage on said second database according to an account identifier;

the investor transmitter also for transmitting the account identifier;

a second database transmitter for retrieving and transmitting the account information and custodian delivery instruction corresponding to the received account identifier; and a broker receiver for generating a confirmation message according to the received account information and for initiating an exchange of funds and securities according to the received custodian delivery instruction to settle the trade.

13. The device of claim 12 including a custodian input unit at a custodian location for generating a custodian delivery instruction to be stored on said first database.

14. The device of claim 13 including means for detecting storage of a custodian delivery instruction on the first database and for generating a message alerting the investor to the custodian delivery instruction, and wherein said first database transmitter also transmits the message to the investor receiver.

15. The device of claim 12 including means for detecting storage of information about an investor account on the second database and for generating a message alerting the broker to the investor account information, and wherein said second database transmitter also transmits the message to a broker receiver.

16. The device of claim 12 including a plurality of broker delivery instructions stored on said first database according to a unique broker identifier, and including means for detecting storage. Of a broker delivery instruction on said first database and for generating a message alerting the custodian to the broker delivery instruction, and wherein said first database transmitter also transmits the message to a custodian receiver.

17. A device for communicating security settlement information between a custodian and a broker, comprising:

a database having hardware and software for storing and retrieving data according to unique identifiers;

a plurality of custodian delivery instructions stored on said database according to identifiers;

an investor transmitter for transmitting an identifier;

a database receiver for receiving an identifier transmitted by said investor transmitter, and for retrieving the custodian delivery instruction corresponding to the received identifier;

a database transmitter for transmitting the custodian delivery instruction retrieved from said database; and a broker receiver for receiving the custodian delivery instruction transmitted from the database transmitter and initiating an exchange of funds and securities in accordance with the custodian delivery instruction to settle the trade.

18. The device of claim 17 including a broker output unit at a broker location for displaying the received custodian delivery instruction.

19. The device of claim 17 wherein the custodian delivery instructions are stored and retrieved on said database together with information about investor accounts, and wherein the identifier comprises an account identifier.

20. The device of claim 19 (including) wherein said database includes a cross reference table of account identifiers and broker account numbers stored thereon, and wherein said database transmitter also transmits the broker account number retrieved from the cross reference table on said database with the received account identifier, and wherein said broker receiver also receives the broker account number to enable identification of the received account information.

21. The device of claim 20 including an investor input unit at an investor location for generating account information and corresponding custodian delivery instructions to be stored on said database.

22. The device of claim 21 including means for detecting storage of information about an investor account on the second database and for generating a message alerting the broker to the investor account information, and wherein said database transmitter also transmits the message to a particular broker, determined from the cross reference table.

23. A device for communicating security settlement information between a broker and a custodian, comprising:

a database having hardware and software for storing and retrieving data according to unique identifiers;

a plurality of broker delivery instructions stored on said database according to broker identifiers;

a broker transmitter for transmitting a broker identifier;.

a database receiver for receiving a broker identifier transmitted by said broker transmitter, and for retrieving the broker delivery instruction corresponding to the received identifier;

a database transmitter for transmitting a broker delivery instruction retrieved from said database with the received broker identifier to an investor receiver;

an investor transmitter for transmitting the broker delivery instruction received from the database transmitter; and a custodian receiver for receiving the broker delivery instruction transmitted from the investor transmitter and initiating an exchange of funds and securities in accordance with the broker delivery instruction to settle the trade.

24. The device of claim 23 including a custodian output unit at a custodian location for displaying the received broker delivery instructions.

25. The device of claim 23 wherein said database generates a list of broker names from the stored broker delivery instructions, and wherein said database transmitter also transmits the list of broker names, and wherein the investor receiver uses the received broker list for directing information about trades.

26. A method for communicating security settlement information between an investor, a broker and a custodian, comprising the steps of:

storing a plurality of broker delivery instructions on a first database according to broker identifiers;

storing information about a plurality of investor accounts on a second database according to account identifiers;

transmitting a broker identifier from a broker transmitter to a first database receiver;

retrieving a broker delivery instruction from the first database with the received broker identifier;

transmitting the retrieved broker delivery instruction with a first database transmitter to an investor receiver;

transmitting the broker delivery instruction received by the investor with an investor transmitter to a custodian receiver;

transmitting an account identifier with the investor transmitter to a second database receiver;

retrieving account information from the second database with the received account identifier;

transmitting the retrieved account information with a second database transmitter to a broker receiver;

generating a confirmation message according to the account information; and initiating exchange of the funds and securities in accordance with the broker delivery instruction.

27. A method for facilitating settlement of an investor's security trades, comprising the steps of:

storing a plurality of custodian delivery instructions on a first database according to custodian identifiers;

transmitting information about an investor account from an investor transmitter to a second database receiver;

transmitting a custodian identifier corresponding to the account information from an investor transmitter to a first database receiver;

retrieving the custodian delivery instruction corresponding to the received custodian identifier;

transmitting the received custodian delivery instruction from a first database transmitter to the second database receiver;

receiving the investor account information and the custodian delivery instruction at a second database receiver;

storing the received account information and the received custodian delivery instruction together on a second database according to an account identifier;

transmitting the account identification from the investor transmitter to the second database receiver;

retrieving the account information and custodian delivery instruction corresponding to the received account identifier;

transmitting the retrieved account information and custodian delivery instruction from a second database transmitter to a broker receiver;

allocating securities in accordance with the received account information; and initiating exchange of securities and funds in accordance with the received custodian delivery instruction.

28. The method of claim 27 including the steps of detecting storage of account information on the second database, generating a message alerting the broker to the account information, and transmitting the message from a second database transmitter to a broker receiver.

29. A method for communicating security settlement information between a custodian and a broker, comprising the steps of:

storing a plurality of custodian delivery instructions on a database according to identifiers;

transmitting an identifier from an investor transmitter to a database receiver;

retrieving the custodian delivery instruction from the database with the received identifier;

transmitting the retrieved custodian delivery instruction from a database transmitter to a broker;

receiving at the broker the custodian delivery instruction transmitted from the database transmitter; and initiating an exchange of funds and securities according to the custodian delivery instruction.

30. The method of claim 29 including the steps of detecting storage of a custodian delivery instruction on the database, generating a message alerting the investor to the custodian delivery instruction, and transmitting the message from the database transmitter to an investor receiver.

31. A method of communicating security settlement information between a broker and a custodian, comprising the steps of:

storing a plurality of broker delivery instructions on a database according to broker identifiers;

transmitting a broker identifier from a broker transmitter to a database receiver;

retrieving a broker delivery instruction from the database with the received broker identifier;

transmitting the retrieved broker identifier with a database transmitter to an investor receiver;

transmitting the broker delivery instruction with an investor transmitter to a custodian;

receiving at the custodian the broker delivery instruction transmitted from the investor transmitter; and initiating an exchange of funds and securities according to the broker delivery instruction.

32. The method of claim 31 including the steps of detecting storage of a broker delivery instruction on the database, generating a message alerting the custodian to the broker delivery instruction, and transmitting the message from the database transmitter to the custodian receiver.

* * * * *